June 1, 1954

A. O. HARRIS 2,679,997

DISPLAY DEVICE

Filed Sept. 23, 1950

INVENTOR.
Arthur O. Harris
BY
Parker, Birchmow Farmer,
Attorneys.

June 1, 1954

A. O. HARRIS 2,679,997

DISPLAY DEVICE

Filed Sept. 23, 1950

INVENTOR.
Arthur O. Harris
BY
Parker, Frichmore Farmer,
Attorneys.

June 1, 1954  A. O. HARRIS  2,679,997
DISPLAY DEVICE

Filed Sept. 23, 1950  4 Sheets-Sheet 3

INVENTOR.
Arthur O. Harris
BY
Parker, Proctor & Farmer,
Attorneys.

June 1, 1954  A. O. HARRIS  2,679,997
DISPLAY DEVICE
Filed Sept. 23, 1950  4 Sheets-Sheet 4

INVENTOR.
Arthur O. Harris,
BY
Parker, Prochnow & Farmer,
Attorneys.

Patented June 1, 1954

2,679,997

UNITED STATES PATENT OFFICE 2,679,997

DISPLAY DEVICE

Arthur O. Harris, Buffalo, N. Y., assignor to
Edwin S. Burrows, Eden, N. Y.

Application September 23, 1950, Serial No. 186,436

3 Claims. (Cl. 248—174)

This invention relates to display or exhibit devices for use in instructing classes or groups of persons on various subjects and which may also be used for advertising demonstrations.

It is well known that in instruction on most subjects, the important features of the subject can best be impressed on and retained in the minds of persons by simple, progressive disclosure through visual demonstrations. I have further found that the mere pointing out verbally of a feature or use of the subject under discussion is generally not as effective as when such feature in addition to a verbal explanation, is also visually called to their attention in such a manner that the visual pointing out of such feature or use remains in view for a considerable period after attention has been called to it verbally.

One of the objects of this invention is to provide a device of this type which is so constructed as to particularly concentrate attention upon the particular object which is being discussed in progressively revealing steps. Another object is to provide a device of this type which is readily adjustable as to size so as to be adaptable for various purposes and for displaying equipment or articles or illustrations of various sizes and shapes. A further object is to provide a device of this type provided with a front panel which may form a substantially continuous flat surface for initial steps in instruction and which has a portion which may be removed to form an opening in the device in which an article may be positioned for showing practical applications to specific objects. A further object of this invention is to provide a display device having a front panel which is so constructed that various types of placards, symbols, paper sheets or other devices may be readily secured thereto in such a manner that they can also be readily removed therefrom. It is also an object of this invention to provide a display device of this type which can be readily folded and carried or stored in compact easily portable form.

Other objects and advantages will be apparent from the following description of one embodiment of the invention and the novel features will be particularly pointed out hereinafter in connection with the appended claims.

Figure 1:
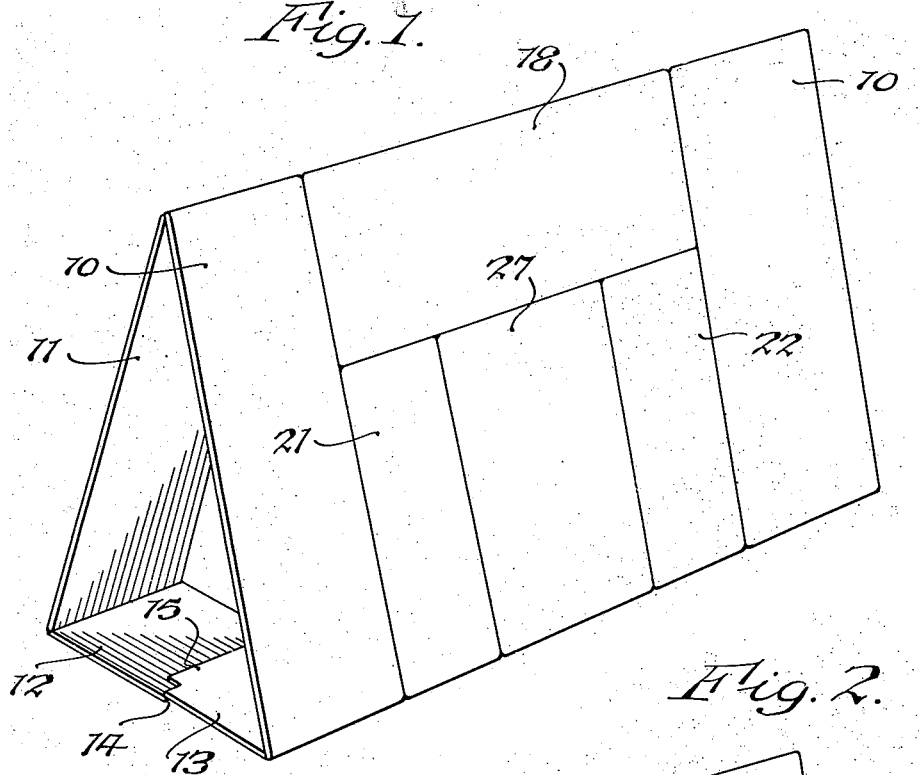
Fig. 1 is a perspective view of a display and exhibit device embodying this invention and showing a larger and a smaller display device positioned so as to form a substantially unitary structure for continuous use in progressive disclosure of the subject matter.
Figure 2:
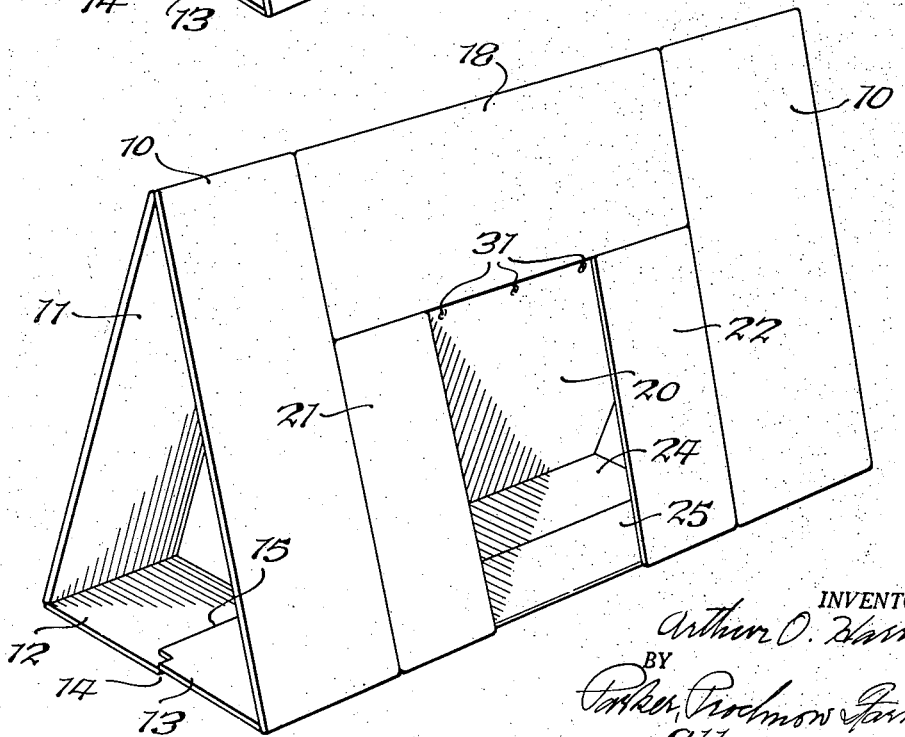
Fig. 2 is a similar view thereof, showing a portion of the front panel of the smaller display device removed to insert an object related to the subject.

Since it is obvious that display devices of different sizes are necessary for use with different subjects or objects to be displayed, I have provided a display device which includes in essence two display devices which may be used either separately or jointly in the progressive coverage of a subject. As seen particularly in Figs. 3 and 4, I have provided a larger display device, illustrated by itself in Fig. 3, and a smaller display device shown in Fig. 4, which fits into an opening in the front of the larger display device to form a substantially unitary display device as illustrated in Figs. 1 and 2. Each of these display devices is preferably in the form of an easel having front and rear panels hinged together at their upper ends and connected at their lower ends to limit the extent to which the panels may spread apart so as to maintain uniform slopes in components. In the construction shown, the larger display device includes a pair of easel-like structures each including a front panel 10 hinged at its upper edge to a back panel 11. The lower edges of the two panels are connected by means of a base or tie member which limits the extent to which the lower ends of the two panels may be spread apart in relation to each other about the upper hinge. In the particular construction shown for this purpose, I have provided a base comprising two sections 12 and 13, the outer edges of which are hinged to lower edges of the front and rear panels and the adjacent edges 14 of the two sections of the base are also hinged together. Preferably one of the sections of the base is provided with an outwardly extending part or lip 15 which is formed to bear against the other section to limit the extent to which the sections may swing about their hinged connection 14.

The hinged connections may be of any suitable or desired type, and preferably cloth or fabric hinges are employed, such as heretofore commonly used in various structures for compact folding. However, metal hinges may be used for heavier, larger sizes.

The two easel-like structures which form the end portions of the larger display device may be connected to each other by means of a panel 18 and preferably this panel is removably secured to the adjacent edge portions of the two easels. This panel may be of the form shown in Fig. 3, or it may be materially larger, even to the extent of filling the entire space between the panels 10.

The smaller component of the display device is constructed similarly to the larger one, except that the rear panel 20 extends throughout the width of the display device and the front panels 21 and 22 are hinged to the upper edges thereof in spaced relation to each other. The base includes a pair of sections 24 and 25 which may be substantially identical in structure with the base sections of the larger display device, but preferably the base sections 24 and 25 extend completely from end to end of the smaller display device. By arranging the two front panels in spaced relation to each other an opening in the front panels is formed which may, if desired, be closed by means of a removable portion or panel 27, which is preferably constructed of a material similar to the front panels of the two display devices. This front portion may be removably secured to the smaller display device in any suitable or desired manner, and in the particular construction shown, the removable portion 27 is provided at the upper edge thereof with a flap or flexible extension 28 hinged to the main body of the removable portion 27 and provided with suitable means for securing the flap to the rear panel 20 of the smaller display device. Any suitable fastening means may be employed for this purpose, and in the construction shown, I have illustrated snap fasteners of the kind commonly used for many purposes. Parts 30 of these snap fasteners are secured to the flap 28 and other parts 31 are secured to the rear panel 20 of the smaller display device. As clearly shown in Fig. 1, when the removable portion 27 is positioned on the smaller display device, it will be held in the opening thereof by means of the fastening devices and the lower edge of the removable part 27 will rest against the forward edge of the section 25 of the base, so that the removable part 27 will lie substantially in the same plane as the front panels 21 and 22, thus providing a smooth surface to which various devices may readily be removably attached.

The dimensions of the smaller display device are such that this device may fit into the space between the front panels 10 of the larger display device and below the cross panel 18, as shown in Fig. 1, so that all of the front panels together with the removable part 27 of the smaller display device will lie substantially in the same plane. The display device is used in this manner when a large continuous surface is required.

Figure 3:
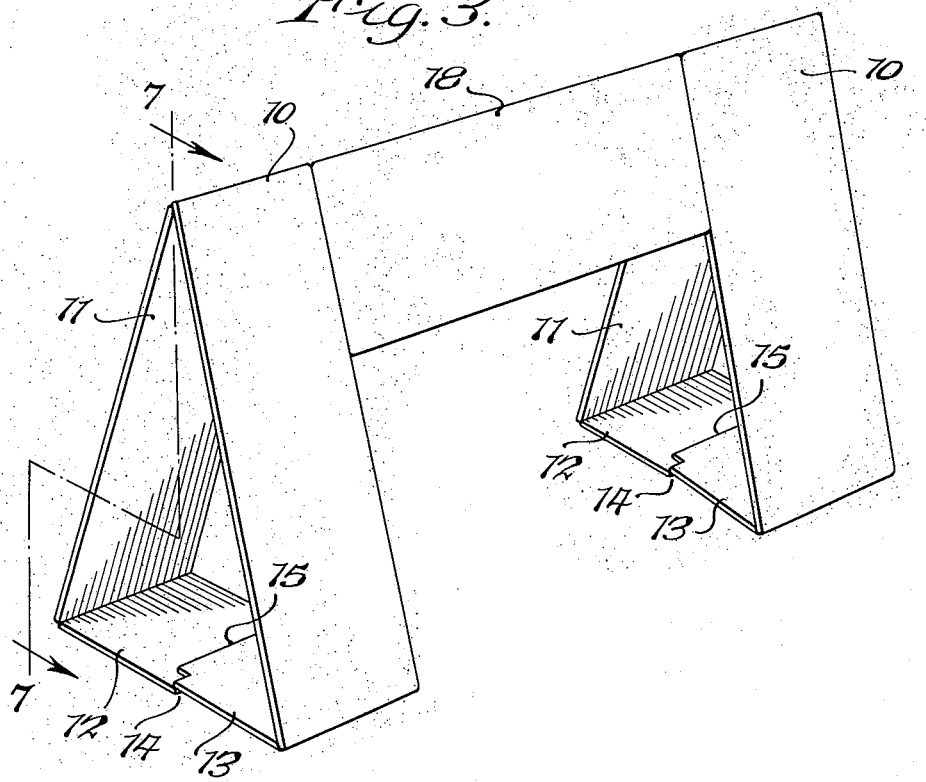
Fig. 3 is another perspective view showing the larger display device with the smaller one removed for simultaneous or progressive separate presentation of parts of subject matter.
Figure 4:
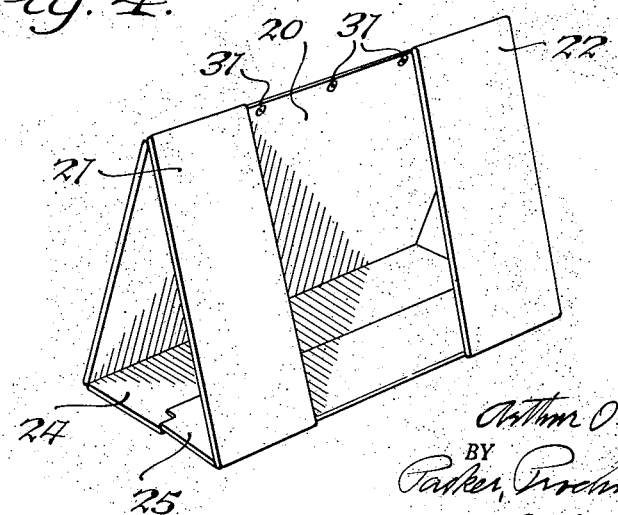
Fig. 4 is a perspective view of the smaller display device with a portion of the front panel removed for similar progressive use.

If the article which is under discussion is of relatively small size, but requires a large front panel surface to describe all of the features of the article, the removable portion or panel 27 is removed from the smaller display device, as shown in Fig. 2, thus forming an opening in the front surface of the display device in which the article or object itself may be positioned so as to be clearly visible. If the article to be displayed is too large to enter into the small opening of the smaller display device, then the smaller display device is removed bodily from the larger one, thus providing a structure as shown in Fig. 3, in which a relatively large article may be positioned in the opening of the front of the display device. If the subject under discussion does not require a large display device or large surface for attachment of indicating devices thereto, the small display device only need be used. If a flat continuous front surface is required, the removable portion 27 may be secured in place. If it is desired to provide an opening in the smaller panel in which an article may be positioned, the part 27 is removed, so that the display device is as shown in Fig. 4. It will be noted that when an article is positioned in the opening of the smaller display device, it will rest on the base of this display device, so that the weight of the article adds to the stability of the display device.

Figure 5:
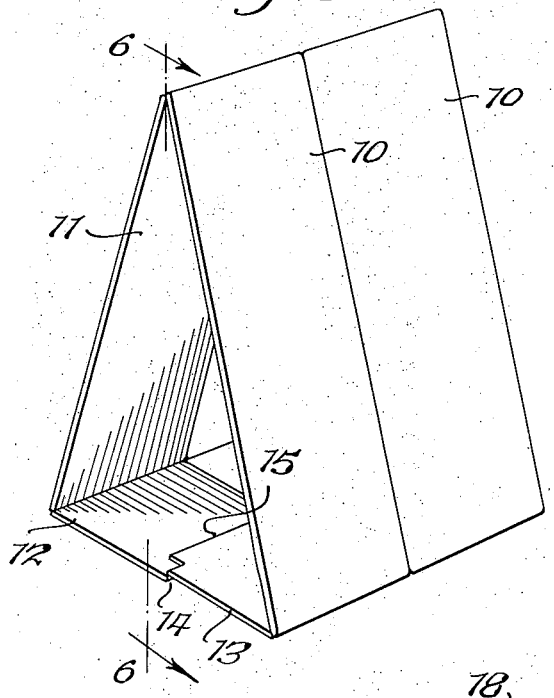
Fig. 5 is a perspective view of the end portions of the larger display device secured to each other without the intermediate portion which is shown in Fig. 3. These portions may also be used as flanking display panels for instruction with large objects or use illustrations.
Figure 6:
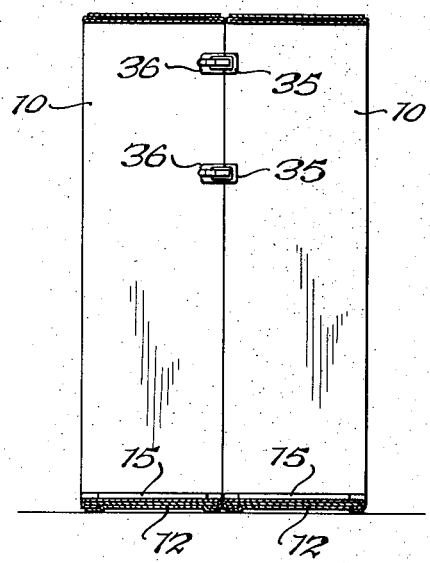
Fig. 6 is a sectional elevation thereof, on line 6—6, Fig. 5.
Figure 7:
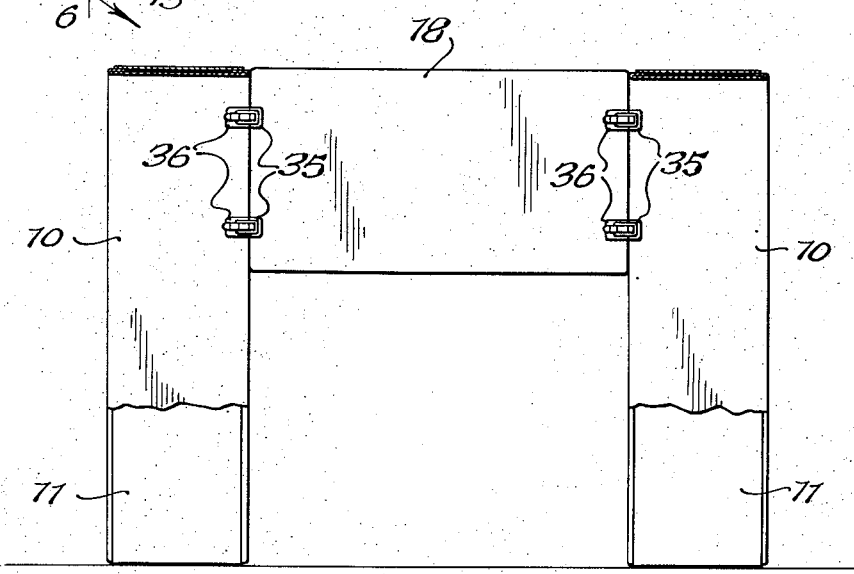
Fig. 7 is a sectional elevation of the larger display device, this section being taken on line 7—7, Fig. 3.

It is also possible to remove the transverse panel 18 of the larger display device if the same is not needed and to fasten the two easel-like portions to each other as shown in Fig. 5. In order to accomplish this, I provide buckles or other fastening devices for removably securing the upper panel 18 to the side panels 10. In the particular construction shown, I have provided buckles which include parts 35 having projections with which movable loops or links forming parts of the other portions 36 of the buckles may cooperate. Fig. 7 shows how these buckles which are secured to the rear faces of the front panels, may be used to secure the upper panel 18 to the front side panels 10. When unbuckled, the front upper panel 18 can readily be removed, and if desired, the two easel-like side parts of the larger display device may then be brought together as shown in Figs. 5 and 6 and secured to each other by means of the buckles. These two easel-like members can, consequently, be used to form a display device having a front surface of materially reduced area as compared with the device as shown in Fig. 1, or they may be used as flanking display panels for very large objects.

Figure 8:
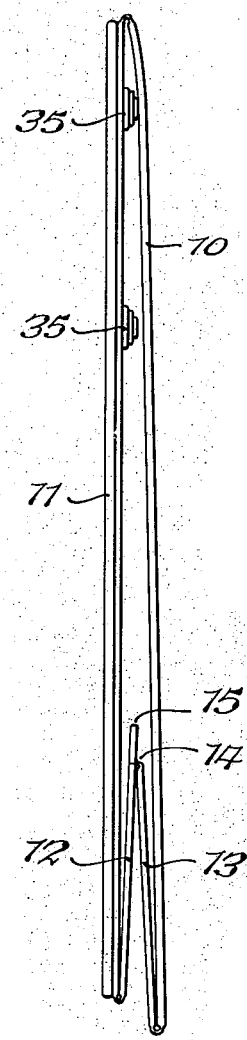
Fig. 8 is an end view, on an enlarged scale, of the device shown in Fig. 3, when folded into its inoperative position.

It will be understood that when not in use the display devices may readily be folded so that the front and rear panels thereof extend substantially parallel to each other, as shown, by way of example in Fig. 8. Since the large display device is built up in sections, consisting of the two side easels and the intermediate upper connecting panel 18, the display device can be reduced to relatively compact form for easy transportation and storage, by detaching the intermediate panel 18 from the easel members.

Figure 9:
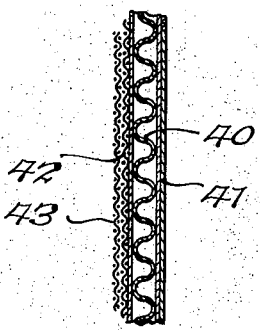
Fig. 9 is a fragmentary section, on a still larger scale, showing the structure of the front panel.
Figure 10:
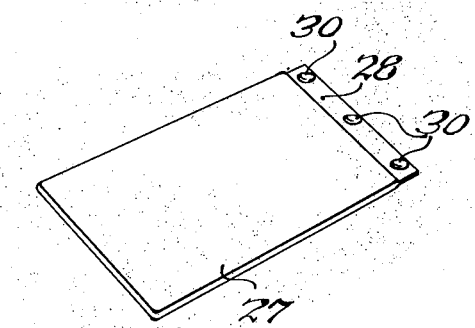
Fig. 10 is a perspective view of the removable portion of the smaller display device detached therefrom.

The front panels may be made of any suitable or desired material which is best suited for the intended use of display devices. I prefer, however, to provide all of the front panels with surfaces to which various cards or articles might be attached both by thumb tacks and by friction or by a felting action. In Fig. 9 is shown a cross section illustrating by way of example a structure which may be employed on the front panels and on the removable member 27 of the display device. In this construction, 40 represents a relatively rigid material which is sufficiently porous to receive pins, thumb tacks or other pointed articles, and which may for example be a corrugated box board of any suitable or desired construction. The porous material preferably has a protective covering material 41 secured to the back face thereof. In place of corrugated paper, sheets of wood or other material which will receive thumb tacks or the like may be used. On the front face of the corrugated board is provided a layer 42 of a self-sealing composition sheet. Compositions of this type are readily available on the market. These sheets include rubber or synthetic rubber of the type which is self-sealing so that if the point of a pin, thumb tack or other sharp pointed object is driven through the material, the hole thus formed will close itself up when the sharp pointed object is removed. Material of this kind may be used indefinitely without becoming so filled with holes that it will not hold the thumb tacks. Even though the corrugated board or other sheet material may be more or less perforated by repeated entry of thumb tacks, pins or the like into the same, the layer 42 will still hold such sharp pointed objects.

The outer covering of the front panels 43 is in the form of a sheet of cotton flannel, the outer surface of which has been treated in any suitable manner so as to hold by friction, sandpaper or flock backed placards or other devices or symbols. When such devices or symbols have a backing either of sandpaper or of a flock material, they will remain in place on the flannel by friction or by a felting action, even though the front panels are in upright position. For example, if an article is displayed within the opening of the display device, or affixed to the surface by thumb tacks, it may be desirable to provide arrows or printed matter pointing out certain uses, advantages or features of the articles displayed and such arrows or other devices when backed with sandpaper or flock material may be positioned as desired on the front panels by merely pressing them against the flannel surface. If such articles or illustrations are too heavy to be merely held on the front surfaces by friction or felting action, pins or thumb tacks may be used to penetrate the outer layers of the panels and thus supplement the action of the flannel to hold the devices on the front panels. It is, of course, possible also by means of the construction of the front panels illustrated in Fig. 9 to secure to the front panels articles which do not have the back portions thereof finished so as to adhere by friction or matting to the front panels, in which case pins or thumb tacks may be used to position such devices on the front panels.

The display devices herein illustrated and described may be used for various types of instruction, information and displays. For example, these display devices have been found very valuable for instruction in selling principles and methods, in which case, the instructor may start out with the display device as shown in Fig. 1 by placing illustrations or various other data on the front panels and pointing out the selling methods to be used in connection with such articles. Then a portion of the front panel may be removed to display the actual article, or the article may initially be displayed in an opening in the device, whereupon the instructor may attach to the front surface arrows pointing to various parts of the article together with placards or other printed matter to concentrate attention on the advantageous features of such articles. Similarly the device may be used for instruction in supervision principles and methods, for instruction in industrial arts, principles and methods, or for military use for presenting, demonstrating, practicing and conveying to others various military principles, problems and solutions, or in connection with the study of weapons or parts thereof which may be displayed in the openings in the display devices. Finally the display device may also be used to advantage in connection with the advertising of goods, in which case, the articles to be sold may be positioned in the openings of the display devices and various literature and devices pointing out the merits of the articles may be provided on the front panels.

The surface of the assembled device may also be used as a screen for the light projection of illustrations of articles, uses, maps, terrain features and sketches, floor plans of plants or buildings or the like. In which case, attached symbols, descriptive plaques or indicating arrows may be superimposed on the projected images to describe, illustrate or call attention to features, positions and relations of parts to the subject.

It will be understood that various changes in the details, materials, and arrangements of parts which have been herein described and illustrated in order to explain the nature of the invention, may be made by those skilled in the art within the principle and scope of the invention, as expressed in the appended claims.

I claim as my invention:

1. A display device including a front panel, a rear panel hinged at its upper edge to the upper portion of said front panel and a base portion hinged at its front and rear edges respectively to the lower edges of said front and rear panels, said front panel including a removable portion which may be removed from said front panel to form an opening in said front panel to permit an article to be displayed to be placed in said opening, said removable portion, when mounted on said front panel, lying substantially in the plane of said front panel, and a second display device also having front and rear panels and a connecting base member and having an opening in the front panel into which said first display device may be placed with the front panel thereof lying substantially in the plane of the front panel of said second display device to form an enlarged continuous display surface.

2. Display apparatus including a pair of display devices each comprising a front panel, a rear panel hinged at its upper edge to the front portion of said front panel, and a connecting portion connecting said front and rear panels to limit the extent to which said panels may swing relatively to each other, one of said display devices being larger than the other and the larger of said display devices having an opening in the front panel thereof in which the smaller of said devices may be positioned with the front panel thereof lying substantially in the plane of the front panel of said larger device, said smaller display device having a removable portion on the front panel thereof which may be removed to form an opening in which an article to be displayed may be positioned.

3. Display apparatus including a pair of display devices each comprising front and rear panels hingedly connected at their upper edges and a connecting portion connecting said front and rear panels to limit the extent to which said panels may swing relatively to each other, one of said display devices being larger than the other and the larger of said display devices comprising a pair of easel-like members connected at their upper front portions with a transversely extending panel and forming below the same and between said easel-like structures an opening into which the smaller of said devices may be inserted with the front panel thereof substantially in the same plane as the front panels of said larger display device, with the base of said smaller display device lying substantially in the same plane as the bases of said easel-like parts of said larger display device.

References Cited in the file of this patent

UNITED STATES PATENTS

| Number | Name | Date |
|---|---|---|
| 1,148,114 | Morris et al. | July 27, 1915 |
| 1,164,755 | Rouse | Dec. 21, 1915 |
| 1,411,768 | Anderson | Apr. 4, 1922 |
| 1,485,786 | Kraft | Mar. 4, 1924 |
| 2,132,799 | Ostrander | Oct. 11, 1938 |
| 2,195,985 | Fox | Apr. 2, 1940 |
| 2,431,835 | Smith | Dec. 2, 1947 |
| 2,441,395 | Buttery | May 11, 1948 |
| 2,465,963 | Howard | Mar. 29, 1949 |

FOREIGN PATENTS

| Number | Country | Date |
|---|---|---|
| 628,720 | Great Britain | Oct. 10, 1950 |